Patented Dec. 13, 1927.

1,652,222

UNITED STATES PATENT OFFICE.

ALBERT F. W. VICK, OF CYNWYD, PENNSYLVANIA.

COMPOSITION FOR FILLING CAVITIES IN TREES.

No Drawing. Application filed June 16, 1923. Serial No. 645,906.

In the case of trees having diseased and decayed portions therein the removal of such portions and the filling of the cavities thus produced with a composition of matter of one kind or another has become a very general practice; but for one cause or another the compositions or compounds heretofore in use have not been entirely satisfactory. Such compositions or compounds have in some instances been too rigid and too heavy; in others too porous; and in others the expansion and contraction thereof under the influence of heat and cold have been so different from the corresponding characteristics of the wood of the tree under treatment that disastrous results have followed. These suggestions are indicative merely of the difficulties which heretofore have been encountered.

The general object of my invention is to provide a novel composition of matter, free from the objections inherent in the fillers heretofore in use, which is adapted for use as a filler for the cavities in trees produced by the removal of decayed and diseased portions thereof.

A further object of the invention is to provide a novel composition of matter for the purpose indicated which is durable; which has sufficient elasticity to permit it to bend and sway in harmony with the bending and swaying of a tree having a cavity in which it has been placed; and which also possesses the requisite characteristics of contraction and expansion under the influence of cold and heat as compared with the wood of the tree under treatment.

It is practically impossible to provide a filler having properties of elasticity, contraction, etc., identical with the corresponding characteristics of the woods of trees of the various varieties which may be treated, but it is possible to produce a composition of matter for filling trees in which these characteristics shall approximate the corresponding characteristics of the woods of the trees being treated with sufficient closeness for all practical purposes.

Other objects and advantages of the invention will be pointed out in the detailed description thereof which follows or will be apparent from such description.

My invention consists of a composition including the following ingredients, namely, calcined magnesite; wood-flour, that is, finely divided wood; asbestos, preferably in the form of relatively short portions, one-eighth of an inch, more or less, in length; amorphous or colloidal silica, known in the trade and sold as "decomposed silica"; and magnesium chloride in solution.

The first four of the above named ingredients may be employed in the proportions of one hundred pounds of calcined magnesite, fifty pounds of wood-flour, twenty-five pounds of asbestos and twenty-five pounds of amorphous or colloidal silica. It is to be understood that these proportions may be varied to a considerable extent without departing from my invention. The ingredients should be employed in such proportions that the finished product shall possess the desired qualities and characteristics of elasticity, requisite contraction and expansion under the influence of cold and heat as compared with the corresponding qualities and characteristics of the wood of the tree under treatment, and other qualities incident to a filler satisfactory for the purpose in hand. The four ingredients above mentioned are thoroughly mixed and intermingled. Preferably in the mixing and intermingling of these ingredients small portions thereof are placed in a mixing box or vat and are thoroughly mixed together. Thereafter additional small portions are added and are thoroughly mixed with each other and with the portions previously mixed together and so on until the mixing of the materials has been completed. The mixture thus produced is dried and is ready to be placed in vats or other containers and is then ready for admixture with magnesium chloride in solution for the production of a plastic mass of a character which may be inserted and packed into a cavity to be filled.

In the use of the composition for filling the cavities of trees the decayed and diseased portions or sections of the tree are removed so as to produce a clean cavity free from diseased or decayed particles after which the said cavity preferably should be covered with a coating of paint impervious to the salts which may be present in the filling compound or composition. Asphaltum paint may be employed with good results, particularly when Trinidad asphaltum is employed as an ingredient, but any other suitable paint impervious to water and to the salts of the composition may be employed.

The cavity having been prepared the proper amount of the dry mixture is then admixed with magnesium chloride in solution and immediately packed into said cavity. The magnesium chloride solution may have a specific gravity ranging from eighteen to twenty-three degrees Baumé but generally a solution having a specific gravity of nineteen or twenty degrees Baumé will be employed. The proportions of the dry mixture and magnesium chloride solution should be such as to produce a product having such plasticity that it may be readily inserted into the cavity and tightly molded against the sides thereof so as to completely fill the same.

By the combining of the ingredients as above indicated I produce a composition which when it hardens and sets possesses the requisite qualities and characteristics of elasticity, specific gravity or weight, porosity, contraction and expansion and also the requisite healing qualities to render it efficient and desirable as a filling material for the cavities of trees of various kinds and varieties.

I desire it to be understood that my invention is not limited to the exact proportions of the ingredients employed in the production of the composition as hereinbefore set forth but such proportions may be varied within reasonable limits as may be found desirable in practice; also that my invention extends to and comprehends other ingredients than those mentioned which may be substituted therefor as equivalents.

Having thus described my invention what I claim and desire to secure by Letters Patent is:

A composition of matter for use in the filling of cavities in trees comprising in admixture calcined magnesite, finely divided wood, asbestos fiber and amorphous silica in the proportions of about one hundred pounds of calcined magnesite, fifty pounds of finely divided wood, twenty-five pounds of asbestos and twenty-five pounds of the said silica combined with sufficient magnesium chloride to form a plastic composition.

In testimony that I claim the foregoing as my invention I have hereunto signed my name this 23rd day of February, A. D. 1923.

ALBERT F. W. VICK.